United States Patent
Mirick

[15] 3,674,729
[45] July 4, 1972

[54] CORRECTION FLUID COMPOSITION
[72] Inventor: William M. Mirick, Worthington, Ohio
[73] Assignee: The Battelle Development Corporation, Columbus, Ohio
[22] Filed: July 7, 1970
[21] Appl. No.: 53,004

[52] U.S. Cl..................260/23 AR, 96/27 R, 260/31.8 R, 260/33.6 UA, 260/33.8 UA, 260/41 R, 260/41 A, 260/41 B, 260/41 C
[51] Int. Cl........................................................C08f 29/38
[58] Field of Search..............260/33.8 UA, 23 AR, 33.6 UA, 260/31.8 R

[56] References Cited

UNITED STATES PATENTS 3,276,870   10/1966   Bitting et al......................260/41.5 X Primary Examiner—Donald E. Czaja
Assistant Examiner—Donald J. Barrack
Attorney—Gray, Mase and Dunson

[57] ABSTRACT

A significantly nonflammable correction fluid composition of a liquid vehicle and solid constituents with the liquid vehicle consisting essentially of nonflammable polychloro hydrocarbon solvent and with the solid constituents consisting essentially of a small amount of a film-forming acrylate resin and a major amount of an organic optical brightener/silica-modified rutile titanium dioxide pigment accompanied by a small amount of a flatting or extender pigment; the correction fluid composition of utility in photo reproduction of copies by a process wherein erroneous matter of an original is overcoated and corrective matter imprinted on the dried overcoating prior to photo reproducing of correct copies.

10 Claims, No Drawings

CORRECTION FLUID COMPOSITION

DISCLOSURE

This invention relates to a correction fluid composition and its preparation. More particularly, the invention concerns a correction fluid composition of significant nonflammability which composition contains as its principal constituents a film-forming acrylate resin, an optical brightener/silica-modified rutile titanium dioxide pigment, and a solvent vehicle predominantly of a halogenated hydrocarbon solvent.

Within about the last 20 years and concurrent with increasing usage of copying machines for photo reproduction of originals of letters, printed matter, and the like, there has come into prevalent usage a process for correcting and/or modifying the originals so that the subsequent reproduction thereof yields flawless copies depicting a desired correction or modification yet with no apparent discernment on the copies of the particular alteration made on the original. That process generally makes use of a correction fluid composition whereby an erroneous portion of the original or master is overcoated to mask it from view, i.e., masked at least to the extent to be nondiscernible on copies thereof subsequently photo reproduced by copying machines, and thereafter a corrective or modified marking or printing is applied on top of the overcoating prior to copy reproduction. As illustrated by art teachings, such as U.S. Pat. No. 3,276,870; Canadian Patent No. 604,624; and British Patent No. 837,813; and the like, a useful correction fluid composition for such purposes comprises an organic solvent vehicle and solid material, which includes a small amount of resinous binder and a large amount of pigment, with the various composition's components and their amounts being of import to provide those properties and characteristics required for its intended application. It is to the foregoing art to which the present invention is directed and in which the correction fluid composition of the invention is most useful.

The correction fluid composition of the invention significantly improves over prior art correction fluid compositions principally in that toxicity and flammability hazards have been decreased. The composition of the invention by being significantly nonflammable advantageously lends itself readily for shipping in commerce with little to none of those restrictive requirements as are imposable on prior art compositions containing toluene and like solvents (Note: Cleveland open cup flash point for toluene is about 45° C.). Additionally, hiding power has been improved; gloss and color have been matched closer to papers customarily employed for business letters and the like; and problems occurring during the compositions' usage, such as caking around container tops, have been minimized by the composition of the invention. In general, the improved correction fluid of the composition, alike past compositions, also contains such principal constituents as a solvent vehicle and solids which are a resinous binder and a pigment. However, in the composition of the invention only certain materials are useful as the principal constituents thereof and then only in limited and coordinated amounts with such materials and their amounts being critical and interdependent in order to provide a substantially nonflammable composition having the characteristics and properties requisite for utility as a correction fluid composition. In the composition of the invention, a special pigment is used; the solvent vehicle employed predominantly is only of certain chlorinated hydrocarbons; and other significant differences also will be apparent from what follows.

Broadly a composition of the invention includes the constituents of (a) a film-forming acrylate resin, (b) an organic optical brightener/silica-modified rutile titanium dioxide pigment, and (c) a liquid vehicle of at least 75 percent by volume from among certain chlorinated hydrocarbon solvents, with the various constituents and their amounts inter-related and dependent on each other so as to be critical and unobvious from prior compositions. The correction fluid composition of the invention consists essentially of:

(1) between 40 and 60 percent by weight of a liquid vehicle of
  a. at least 75 percent by volume from among halogenated hydrocarbon solvents which have a boiling point temperature between 70° and 170° C. and are non-flammable at their boiling point temperature; and
(2) a balance of the composition of
  a. a film-forming acrylate resin in an amount between 10 and 20 percent by weight of the total of said solid constituents, and
  b. a balance of the solid constituents substantially of
    i. an organic optical brightener/silica-modified rutile titanium dioxide pigment consisting essentially of at least 88 percent by weight of rutile titanium dioxide having incorporated therein between 0.05 and 0.6 percent by weight of an organic optical brightener and between 10 and about 12 percent by weight of $SiO_2$, and
    ii. a flatting pigment amounting to between 5 and 20 percent by weight of the total of solid constituents.

More particularly, the liquid vehicle of the composition generally is:
  a. several of the halogenated hydrocarbon solvents; or
  b. a blend of at least one of the halogenated hydrocarbon solvents with up to 25 percent by volume of the blend of an organic solvent.

The preferred correction fluid composition of the invention consists essentially of:

1. between 47 and 57 percent by weight of a liquid vehicle of
  a. a blend of at least two polychloro hydrocarbon solvents selected from the group consisting of 1,1,1-trichloroethane, 1,1,2-trichloroethane, 1,1,2,2-tetrachloroethane, pentachloroethane, 1,1,2-trichloroethylene, and 1,1,2,2-tetrachloroethylene, with an unsymmetrical polychloro hydrocarbon solvent being included when the blend includes 1,1,2,2-tetrachlorethane and 1,1,2,2-tetrachloroethylene; and
2. a balance of solid constituents of
  a. a film-forming acrylate resin which is a homo or copolymer of a lower alkyl ester of acrylic acid, methacrylic acid, ethacrylic acid, or mixture thereof containing up to and including four carbon atoms in their ester moiety with the film-forming acrylate resin amounting to between 11 and 16 percent by weight of the total of the solid constituents, and
  b. a balance of the solid constituents substantially of
    i. an organic brightener/silica modified rutile titanium dioxide pigment consisting essentially of at least 88 percent by weight of rutile titanium dioxide having incorporated therein between 0.1 and 0.4 percent by weight of an organic optical brightener and a balance essentially of silica, and
    ii. a flatting and extender pigment, which is a diatomaceous silica, in an amount between 6 and 11 percent by weight of the total of the solid constituents.

The composition of the invention contains a preponderance of a halogenated hydrocarbon solvent, which serves to dissolve the film-forming acrylate resin and to act as a vehicle for dispersion of the organic optical brightener/silica-modified rutile titanium dioxide pigment. The employed halogenated hydrocarbon solvent is a polychloroaliphatic compound and, in particular is one of the polychloro-alkyl and -alkenyl liquid compounds nonflammable at their boiling point temperature, (i.e., no flash point at boiling under ASTM D92—IP36, Flash, Fire Point by Cleveland Open Cup). The useful halogenated hydrocarbon solvents have boiling points between about 70° to 170° C. Illustrative and representative of these polychloro-alkyl and -alkenyl liquid compounds, useful as the halogenated hydrocarbon solvent, are: 1,1,1-trichloroethane; 1,1,2-trichloroethane; 1,1,2,2-tetrachloroethane; pentachloroethane; 1,1,2-trichloroethylene; and 1,1,2,2-tetrachloroethylene.

The foregoing halogenated solvents, while noted for their lack of flammability, do possess some drawbacks. They are not directly substitutable simply as the solvent per se in the prior art correction fluid compositions aforementioned; they generally are poor solvents for various film-forming resin components; and the essential opaque pigment of the composition is not adequately wetted by the solvent, which leads to instability of the composition with pigment settling out and not being easily redispersed. Also caking around the lip of the composition's container generally is increased during conventional usage of the composition. Odor of some also in not pleasing to some people. To obtain solvation of the film-forming acrylate resin as well as a suitable and/or optimum drying of the applied composition it generally is necessary to employ a blend of several of these halogenated hydrocarbon solvents and/or include a small amount of a more volatile organic solvent for the resin. The symmetrical polychloro-alkyl and -alkenyl hydrocarbon solvents, namely tetrachloroethane and tetrachloroethylene, are particularly poor solvents for the acrylate resin, while the unsymmetrical polychloro-alkyl and -alkenyl liquid solvents will dissolve the film-forming acrylate resins. Accordingly, when including tetrachlorethane and tetrachloroethylene in the composition, one always also includes the more volatile organic solvent or an unsymmetrical polychloro-alkyl or -alkenyl liquid solvent in order to solvate adequately the acrylic resin. Thus, while the liquid vehicle employed in the improved correction fluid composition, predominantly is at least 75 percent by volume of a halogenated hydrocarbon solvent, a single halogenated hydrocarbon solvent generally is not used by itself, but instead it usually is accompanied by one or more additional liquid constituents in order to provide a commercially useful correction fluid composition. As already mentioned, drying time of the applied composition can be varied by including a small amount of a more volatile organic solvent. Drying time can be made suitable and adjusted over a wide range to provide any desired and suitable drying time from a small fraction of a minute up to a minute or more through blending of the various halogenated hydrocarbon solvents, and/or through inclusion with the halogenated hydrocarbon solvent, of a more volatile organic solvent. Useful organic solvent additives include toluene, xylene, 2-ethoxyethanol, 2-ethoxyethyl acetate, ethyl acetate, butyl acetate, and the like, which have a greater solvency for film-forming acrylate resins than the halogenated hydrocarbon solvent. These organic solvents are useful in amounts up to about 25 percent by volume of the solvent blend while still providing a significant decrease in flammability. For example, solvent blends of up to about 20 percent by volume of toluene and/or xylene with trichloroethylene still provide vapors snuffing out an open flame at 180° F. in the Cleveland open cup test; that is, they provide a better than 50 percent improvement in nonflammability compared to an employing solvent vehicle which is a blend of only toluene and xylene. For optimum nonflammability it is preferred that the solvent consist essentially only of those polychloro-alkyl and -alkenyl liquid compounds aforementioned and preferably a blend of the same. Advantageously the useful halogenated hydrocarbon solvents present no greater toxicity hazards and most generally diminish any such hazards in comparison to conventional organic solvents used in most commercially available correction fluid compositions. Toluene and xylene are preferred organic solvent additives for increasing solvency of the acrylate resin and for adjusting drying time, and when employed, are blended with the halogenated hydrocarbon in amounts up to about 25 percent by volume of the solvent blend. A particularly useful and preferred blend of the halogenated hydrocarbon solvents is a solvent blend of tetrachloroethylene and 1,1,1-trichloroethane in a ratio between 1 to 5 parts by volume of tetrachlorethylene for each part by volume of the 1,1,1-trichloroethane.

To facilitate wetting of the special pigment by the film-forming acrylate resin and the halogenated hydrocarbon solvent, between 0.1 and 2 percent by volume of the liquid constituents of the composition is a wetting agent, preferably dioctyl sodium sulfosuccinate, although other dispersing and/or wetting agents and other sulfosuccinate wetting agents may be used. Illustrative of useful wetting agents are isopropyl napthalene sodium sulfosuccinate, dihexyl sodium sulfosuccinate, dibutyl sodium sulfosuccinate, diamyl sodium sulfosuccinate, N-octadecyl disodium sulfosuccinate, and the like. Preferably the employed amount of sulfosuccinate wetting agent is about 0.1 to 0.5 percent by volume of the liquid constituents. Alternatively in lieu of and in place of a sulfosuccinate wetting agent, one may employ aluminum stearate or like metal salt of a higher fatty acid of between 12 to 22 carbon atoms as an agent to provide adequate wetting and a relatively stable dispersion of the pigment in the composition. When included, these dispersing agents of metal salts of higher fatty acids generally are included in an effective amount up to 2 percent by weight of the composition. The employment of the foregoing dispersing and/or wetting agents not only facilitate wetting of the pigment and uniform dispersion of the pigment in the composition, but also aid in a ready redispersion, as by shaking of the container, of the pigment and avoidance of any coherent caking of the pigment if pigment settles out of the vehicle during storage of the composition.

As a further aid to increasing the wetting of the special pigment, one generally also includes a small amount of pine oil, up to about 6 percent by volume of the liquid consitutents. This additive in addition to imparting wetting properties, also assists in masking odors of the halogenated hydrocarbon solvent by imparting a pine oil fragrance more pleasing to some users. Of course, if desired, other known odor-making and/or pleasing odor-imparting additives may be included in small amounts, i.e., up to 2 percent by volume of the liquid constituents.

The resin binder employed in the composition is a film-forming acrylate resin, and more particularly is a film-forming homo- or co-polymer of the lower alkyl esters (up to and including four carbon atoms in the ester group) of acrylic acid, methacrylic acid, ethacrylic acid, and their mixtures. These film-forming polymers are well known and are available commercially as various film-forming homo- and co-polymers of methyl, ethyl, propyl, and butyl acrylate, methacrylate, and ethacrylate. A particularly useful film-forming acrylate resin is a methyl acrylate/methyl methacrylate/ethyl methacrylate copolymer from copolymerizing about 2–10 parts by weight of ethyl methacrylate monomer with about 45 to 49 parts by weight each of methyl acrylate and methyl methacrylate monomers. Illustrative of a useful film-forming acrylate resin available commercially is Acryloid B—72 (Rohm & Haas Company).

If desired, a plasticizer or plasticizers may be employed with the film-forming acrylate resin binder so as to provide, for the employed special titanium dioxide pigment, a binder matrix of reduced embrittlement so as to prevent chipping or flaking off of the coating, and especially so as to prevent chipping of the dried coating upon being struck by a typewriter key. Many acrylate resins and particularly copolymers and acrylate resin blends containing poly (ethyl and higher) acrylate commonomers and resins in the copolymers and the resin blends, are plasticized internally adequately. However if another or external plasticizer is included, it generally is included in an amount up to and not exceeding about 5 percent by weight of the amount of included film-forming acrylate resin. Useful external plasticizers are those known to be compatible with and to plasticize acrylate resins. Illustrative of these conventional plasticizers are high-molecular ester plasticizers, such as butyl benzyl phthalate, butyl phthalate, dioctyl phthalate, as well as the conventional plasticizing adipates, azelates, benzoates, citrates, phosphates, sebacates, and like ester plasticizers for acrylate resins.

The composition of the invention includes a special rutile titanium dioxide pigment, which has higher hiding power, tinting strength, and oil absorption than commercial rutile titanium dioxide pigments per se and also possesses other unusual properties. This employed pigment is identified herein as an organic optical brightener/silica-modified rutile titanium dioxide and differs significantly from rutile $TiO_2$ per se in that while it contains a large amount of rutile $TiO_2$ it also incorporates small but significant amounts of $SiO_2$ and an organic optical brightener. More particularly, this organic optical brightener/silica-modified rutile titanium dioxide consists essentially of more than 88 percent by weight of rutile titanium dioxide having incorporated therewith an effective amount of about 0.05 up to 0.6 percent by weight of an organic optical brightener, and a silicon dioxide content generally between 10 and about 12 percent by weight.

This special pigment is preparable in several different ways. One procedure starts with the rutile titanium dioxide product obtained from the calcination of hydrolytically precipitated and recovered titanium hydrous oxides from sulfate solutions of the titanium-bearing raw material, e.g., ilmenite. This starting material is that calcination product intermediate in the conventional process for producing rutile titanium dioxide which customarily would be subsequently dispersed in water, wet ground, and by means of thickeners and filters recovered to provide, after drying in a rotary drier and disintegration, a useful rutile titanium dioxide pigment. To provide the special pigment employed in the composition of the invention, such a calcination product is: dispersed in water; there is added to this water dispersion appropriate amounts of silica and organic optical brightener, either separately or together or as fine silica particles having the brightener coated thereon; and the resulting aqueous composition then is wet ground, recovered, dried, and disintegrated as in conventional preparation of rutile $TiO_2$ to provide an organic optical brightener/silica-modified titanium dioxide pigment useful in the composition of the invention. It is understood this special pigment also is preparable in an alternative manner. Quartz, magnesium silicate, talc, muscovite, diatomaceous silica, or other like siliceous mineral may be mixed with hydrolytically precipitated titanium hydrous oxides from sulfate solutions of titanium-bearing raw material as in the conventional preparation of a rutile titanium dioxide by the conventional precipitation process and after calcination of this mixture there is added the organic optical brightener to the calcination product prior to or after wet grinding, recovering, drying, and disintegration of the same. Optical brightening agents are a special class of essentially colorless fluorescent organic substances which absorb ultraviolet radiation above 3,000 A and emit this as visible radiation below 5,500 A. The organic optical brightener employed for incorporation generally is the reaction product of cyanuric chloride with 7-amino-3-phenyl-coumarin and diethyl amine. Other coumarin-derived brighteners as well as many of numerous other types of brighteners including various deviations of bistriazinyl-4,4'-diaminostilbene-2,2'-disulfonic acid, the biazoles, such as vinylenebisbenzimidazoles, imidazolones, pyrazines, aminonaphthalimides, oxadiazoles, and the like, also are useful upon incorporation in and/or with the silica-rutile titanium dioxide.

A special rutile titanium dioxide pigment, particularly useful in the composition of the invention is available commercially under the name HORSEHEAD R—771 titanium dioxide (The New Jersey Zinc Company). Its data sheet reports this pigment to have high hiding power and tinting strength, as well as excellent dispersion properties in both aqueous and oil media, and typical properties of: Refractive Index-2,7; Specific gravity-3.8; lbs. per solid gallon-31.7; 1 lb. bulks, gals.-0.0315; Spatula Oil absorption-40 (lbs. oil 100 lbs. pigment); and minimum $TiO_2$ content-88 percent.

To better match gloss, color, and the texture of most white business papers with which the correction fluid composition finds greatest usage, and also to increase hiding power, the composition also contains a flatting or extender pigment and usually some tinting additives. The flatting pigment in conjunction with the special rutile titanium dioxide pigment provides better hiding power than rutile titanium dioxide pigment per se. Useful flatting pigments include: diatomaceous silica, which is preferred; talc; calcium carbonate; mica; and the like. The flatting pigment may be included in an amount between 5 and 20 percent by weight of the solid constituents and preferably approximates about 5 percent by weight of the composition. Amounts of silica or like extender pigment larger than about 10 percent by weight of the solid constituents are unnecessary to reduce the gloss of the dried composition to match conventional white business papers. In addition amounts of extender pigment greater than 10 percent by weight of the solid constituents increase the viscosity of the composition and tend toward providing a dried coating which can chip upon being struck with a typewriter key. Although increasing the amount of the acrylate film-forming resin will reduce chipping tendency imparted by including the larger amounts of flatting pigment, it is preferred that the flatting or extender pigment not exceed 10 percent by weight of the solids.

Also included generally are very small amounts of tinting additives up to about one-half percent by weight of the composition, although they generally are included in amounts not exceeding a few hundreths of percent by weight and volume of the composition. Particularly useful are bone-grade carbon black and raw umber, either as fine solid particles or as fine solid particles dispersed in an oil-base paste. Of course other conventional tinting pigments are useful and also may be used in small amounts for purposes of matching the composition with any particular paper or tinted paper to which it is applied.

The following examples provide a better understanding of the invention by presenting particularly preferred embodiments of the improved correction-fluid composition of the invention.

EXAMPLE 1

A correction fluid composition of the following formulation is prepared:

| Solid Constituents | Parts By Weight | or By Volume |
|---|---|---|
| Film-forming acrylate resin such as a methyl acrylate/methyl methacrylate/ethyl methacrylate film-forming copolymer | 6.85 | 10.81 |
| Special rutile $TiO_2$ pigment, containing a minimum of 88 percent by weight of rutile $TiO_2$ and having incorporated therewith about 0.3 percent by weight of coumarin-type organic brightener and a balance consisting essentially of $SiO_2$ | 37.92 | 17.80 |
| Diatomaceous silica, predominantly of 2 to 10 micron size | 4.55 | 3.61 |
| Carbon black, bone-grade | 0.01 | 0.01 |
| Toning iron blue pigment, essentially a complex insoluble ferriferrocyanide | 0.01 | 0.01 |
| Liquid Constituents | | |
| Trichloroethylene, b.p.86.7°C | 44.07 | 54.40 |
| Xylene, b.p. about 139°–140°C | 5.08 | 10.48 |
| Pine oil, b.p. 180°–215°C., chiefly α-terpineol | 1.26 | 2.45 |
| Dioctyl sodium sulfosuccinate | 0.25 | 0.43 |
| Total | 100.00 | 100.00 |

This composition is prepared by adding about one-half of the trichloroethylene and toluene to the film-forming acrylate resin and rolling a container containing the same for at least 1 hour, more usually for several hours, to provide a viscous solution of the resin in the vehicle. Thereupon the special rutile titanium dioxide pigment, the diatomaceous silica, carbon black, and toning iron blue pigment are added thereto and the whole ball milled, usually about 15 to 20 hours, to a fineness grind greater than No. 7 (Hegeman gage). At this time the balance of the trichloroethylene and toluene, the pine oil, and the dioctyl sodium sulfosuccinate are added and the whole ball milled for a short while, usually about one hour, to provide the correction-fluid composition.

The resulting composition has a viscosity of about 250 centipoises (approximates 59 Krebs units), at 180° F. provides nonflammable vapors snuffing out an open flame in the Cleveland open cup test. It also has a drying time of about 45 seconds, i.e., the time from application of a 5-mill-thick wet coating to dry under ambient conditions to a dried state suitable for imprinting thereon such as with a typewriter. In contrast, a commercially available correction fluid composition containing an acrylate resin, rutile titanium dioxide, and primarily toluene as its solvent vehicle has a Cleveland Open Cup flash point below 125° F., a drying time of about 40 seconds, does not closely match color and gloss of usual white business paper, and tends toward pigment caking, and to be more difficult to redisperse its pigment after standing.

EXAMPLE 2

Additional correction fluid compositions of the formulation of Example 1 are prepared following the formulation and procedure of Example 1, except that the amount of xylene included therein is varied so as to provide compositions containing 0, 7.5, 15, 22.5 percent by volume of xylene. Useful correction-fluid compositions are obtained with the following drying times being noted: with no xylene contained therein—drying time of about 20–25 seconds; with 7.5 percent by volume of xylene—drying time of about 30–35 seconds; with 15 percent by volume of xylene—drying time of about 45–50 seconds; with 22.5 percent by volume of xylene—drying time of about 60–65 seconds (drying times are reported as the time from application of a 5-mil-thick wet coating to dry under ambient conditions to a dried state suitable for typing thereon). Nonflammability evaluation of these compositions showed the flame snuffed out at 180° F. in the Cleveland open cut test upon employing solvent blends of xylene and the halogenated hydrocarbon solvent containing xylene contents up to 24 percent by volume of the blend. Caking properties of the compositions were evaluated by means of a motor-driven-cam mechanism which raised and lowered a small applicator brush into and out of an open 1 oz. glass bottle substantially filled with the composition. The applicator brush of this apparatus upon entering and leaving the complication causes waves on the composition's surface which waves splash against the neck of the glass bottle. Observations then are made of time required for composition to cake (i.e., harden and dry) around the neck and rim of the bottle. A commercially available correction fluid composition containing a resin binder, rutile titanium dioxide, and toluene cakes heavily around the neck of the bottle after about 1 ¼ hours upon being subjected to this evaluation. The caking evaluation results for the compositions of this example ranged from some caking being observed after about 1 hour for the one containing no xylene (i.e., having the rapid drying time of about 20–25 seconds) to three hours being necessary for heavy caking with those compositions containing the largest amount of xylene (i.e., having the slower drying time of about 60–65 seconds) with compositions of intermediate xylene contents possessing intermediate caking characteristics.

EXAMPLE 3

A correction fluid of the following formulation is prepared:

| Solid Constituents | Parts By Weight | Parts By Volume |
|---|---|---|
| Film-forming acrylate resin, such as a methyl acrylate/methylmethacrylate acrylate/ethyl methacrylate film-forming copolymer | 6.13 | 9.90 |
| Special rutile TiO$_2$ pigment containing a minimum of 88 percent by weight of rutile TiO$_2$ and having incorporated therewith about 0.3 percent by weight of coumarin-type organic brightener and a balance consisting essentially of SiO$_2$ | 33.92 | 17.23 |
| Diatomaceous silica, predominantly of 2 to 10 micron size | 5.05 | 4.20 |
| Carbon black, bone-grade | 0.01 | 0.01 |
| Raw umber paste, containing about 40 percent by weight of linseed oil and a balance essentially of natural ferric oxide (about 50 percent purity with the principal impurities therein being manganese dioxide and silica) | 0.06 | 0.03 |
| Liquid Constituents | | |
| Tetrachloroethylene, b.p. 121°C. | 42.82 | 50.50 |
| Inhibited 1,1,1-trichloroethane*, b.p. 87°C. | 10.71 | 15.45 |
| Pine Oil, b.p. 180°–215°C., chiefly α-terpineol | 1.11 | 2.33 |
| Dioctyl sodium sulfosuccinate | 0.19 | 0.35 |
| Total | 100.00 | 100.00 |

*Inhibited by the presence of 2.4 to 3.0 percent by weight of dioxane, 0.12 to 0.3 percent by weight of butanol, and small, almost trace amounts, amounts of water and ethylene dichloride.

This composition is prepared by about one-half of an 80/20 blend of the tetrachloroethylene and 1,1,1-trichloroethane and the film-forming acrylate resin being mixed together, such as by rolling a container containing the same for several hours, to provide a viscous solution of the resin in the vehicle. Thereupon, the special rutile titanium dioxide pigment, the diatomaceous earth, carbon black, and raw umber paste are added thereto and the whole ball milled to a fineness grind greater than No. 7 (Hegeman), usually within about 15 to 20 hours of ball milling. At this time the balance of the tetrachloroethylene and 1,1,1-trichloroethane, the pine oil, and the dioctyl sodium sulfosuccinate are added and the whole ball milled for about one hour to provide the correction fluid composition. The resulting composition has a viscosity of about 130 centipoises (approximates 54 Krebs units), is nonflammable at 185° F. with its vapors at that temperature snuffing out an open flame in the Cleveland open cup test, and a drying time for a several mil thick film of about 40 seconds to a dried state suitable for typing thereon.

EXAMPLE 4

An additional correction fluid composition of the formulation of Example 3 is prepared following the formulation and procedure of Example 3, except its content of dioctly sodium sulfosuccinate as the wetting agent is omitted and in place thereof there is added 0.5 percent by weight of aluminum stearate to the formulation. A useful correction fluid composition is obtained having properties and characteristics substantially the equivalent of the composition of Example 3 except that a significant improvement is noted in being able easily to redisperse and resuspend any pigmentation solids in the composition which settle to the bottom of the composition upon extended storage.

EXAMPLE 5

A correction fluid composition of the following formulation is prepared:

| Solid Constituents | Parts By Weight | or By Volume |
|---|---|---|
| Film-forming acrylate resin, such as methyacrylate methylmethacrylate copolymer Acryloid B-72 (Rohm & Haas Company) | 6.75 | 10.69 |
| Special rutile TiO₂ pigment, containing at least 88 percent by weight of rutile TiO₂ and having incorporated therewith about 0.3 percent by weight of a coumarin-type organic brightener and a balance consisting essentially of SiO₂ | 37.44 | 17.91 |
| Diatomaceous silica, predominantly of 2 to 10 micron size | 4.40 | 3.56 |
| Carbon black, bone-grade | 0.01 | 0.015 |
| Toning iron blue pigment, essentially a complex insoluble ferriferrocyanide | 0.01 | 0.015 |
| Liquid Constituents | | |
| Trichloroethylene, b.p. 86.7°C. | 47.48 | 59.82 |
| Xylene, b.p. about 139°–140°C. | 2.46 | 5.23 |
| Pine Oil, b.p. 180°–215°C., chiefly α-terpineol | 1.25 | 2.41 |
| Dioctyl sodium sulfosuccinate | 0.20 | 0.35 |
| Total | 100.00 | 100.00 |

This composition is prepared by a procedure substantially alike that by which the Example 1 composition is prepared and the resulting composition is found to be a useful correction fluid composition.

I claim:

1. A correction fluid composition consisting essentially of:
   1. between 40 and 60 percent by weight of a liquid vehicle
      a. with at least 75 percent by volume of said liquid vehicle halogenated hydrocarbon solvents which are non-flammable at their boiling points and have a boiling point between 70° and 170° C.; and
   2. a balance of the composition of solid constituents of
      a. a film-forming homo- or co-polymer acrylate resin of a lower alkyl ester of acrylic acid, methacrylic acid, ethacrylic acid, or mixture thereof having up to and including four carbon atoms in their ester moiety, with said resin being present in an amount between 10 and 20 percent by weight of the total of solid constituents, and
      b. a balance of the solid constituents consisting essentially of
         i. an organic optical brightener/silica-modified rutile titanium dioxide pigment consisting essentially of at least 88 percent by weight of rutile titanium dioxide having incorporated therein between 0.05 and 0.6 percent by weight of an organic optical brightener, which essentially is a colorless fluorescent organic substance emitting visible radiation below 5,500 A upon absorbing ultraviolet radiation above 3,000 A, and between 10 and about 12 percent by weight of silica, and
         ii. a flatting pigment selected from the group consisting of silica, talc, calcium carbonate, and mica in an amount up to 25 percent by weight of the organic optical brightener/silica-modified rutile titanium dioxide pigment.

2. The composition of claim 1 in which the liquid vehicle consists of:
   a. several of said halogenated hydrocarbon solvents; or
   b. a blend of at least one of the halogenated hydrocarbon solvents with up to 25 percent by volume of the blend of an organic solvent for said film-forming resin.

3. The composition of claim 2 which includes up to 2 percent by weight thereof of a sulfosuccinate wetting agent and in which the liquid vehicle is a blend of 1,1,2-trichloroethylene and xylene.

4. The composition of claim 3 in which the film-forming acrylate resin is a film-forming methyl acrylate/methyl methacrylate/ethyl methacrylate copolymer resin and the wetting agent is a sodium sulfosuccinate wetting agent.

5. A correction fluid composition consisting essentially of:
   1. between 47 and 57 percent by weight of a liquid vehicle of
      a. at least two polychloro hydrocarbon solvents selected from the group consisting of 1,1,1-trichloroethane, 1,1,2-trichloroethane, 1,1,2,2-tetrachloroethane, pentachloroethane, 1,1,2-trichloroethylene, and 1,1,2,2-tetrachloroethylene, with an unsymmetrical polychloro hydrocarbon solvent being included when the blend includes 1,1,2,2-tetrachloroethane or 1,1,2,2-tetrachloroethylene; and
   2. the balance of said composition consisting essentially of solid constituents of
      a. a film-forming acrylate resin which consists of a homo- or co-polymer of a lower alkyl ester of acrylic acid, methacrylic acid, ethacrylic acid, or mixture thereof, having up to and including four carbon atoms in their ester moiety with the film-forming acrylate resin amounting to between 11 and 16 percent by weight of the total of the solid constituents, and
      b. the balance of the solid substituents consisting essentially of
         i. an organic optical brightener/silica-modified rutile titanium dioxide pigment consisting essentially of at least 88 percent by weight of rutile titanium dioxide having incorporated therein between 0.1 and 0.4 percent by weight of an organic optical brightener, which essentially is a colorless fluorescent organic substance emitting visible radiation below 5,500 A upon absorbing ultraviolet radiation above 3,000 A and a balance essentially of silica, and
         ii. a flatting and extender pigment, which is a diatomaceous silica, in an amount between 6 and 11 percent by weight of the total of the solid constituents.

6. The composition of claim 5 which includes between 0.1 and 2 percent by weight thereof of a sulfosuccinate wetting agent and in which the liquid vehicle contains 1,1,2,2-tetrachloroethylene and 1,1,1-trichloroethane.

7. The composition of claim 5 in which the film-forming acrylate resin is a film-forming methyl acrylate/methyl methacrylate/ethyl methacrylate copolymer resin and which contains between 0.1 and 2 percent by weight of a wetting agent which is an aluminum salt of a higher fatty acid of from 12 to 22 carbon atoms.

8. A correction fluid composition, in percent by weight of the composition, consisting essentially of:
1. solid constituents of
    about 7 percent of a film-forming methyl acrylate/methyl methacrylate/ethyl methacrylate copolymer resin,
    about 38 percent of an organic optical brightener/silica modified rutile titanium dioxide pigment having incorporated therein about 0.3 percent of an organic optical brightener, whose structure contains the coumarin radical and which essentially is a colorless fluorescent organic substance emitting visible radiation below 5500 A upon absorbing ultraviolet radiation above 3,000 A, and a balance consisting essentially of silica,
    about 5 percent of diatomaceous silica flatting and extender pigment, and
    less than 0.5 percent of additional pigment coloring and tinting said composition; and
2. liquid constituents of
    about 44 percent of 1,1,2-trichloroethylene,
    about 5 percent of xylene,
    about 1 percent of pine oil of a boiling point between 180° and 215° C., and
    less than 0.5 percent of dioctyl sodium sulfosuccinate.

9. A correction fluid composition, in percent by weight of the composition, consisting essentially of:
1. solid constituents of
    about 6 percent of a film-forming methyl acrylate/methyl methacrylate/ethyl methacrylate copolymer resin,
    about 34 percent of an organic optical brightener/silica modified rutile titanium dioxide pigment having incorporated therein about 0.3 percent of an organic optical brightener, whose structure contains the coumarin radical and which essentially is a colorless fluorescent organic substance emitting visible radiation below 5,500 A upon absorbing ultraviolet radiation above 3,000 A, and a balance consisting essentially of silica,
    about 5 percent of diatomaceous silica flatting and extender pigment, and
    less than 0.5 percent of additional pigment coloring and tinting said composition; and
2. liquid constituents of
    about 43 percent of 1,1,2,2-tetrachlorethylene,
    about 11 percent of 1,1,1-trichloroethane,
    about 1 percent of pine oil of boiling point between 180° and 215° C., and
    less than 015 percent of dioctyl sodium sulfosuccinate.

10. The composition of claim 9 containing less than 0.5 percent of aluminum stearate in place of the less than 0.5 percent of dioctyl sodium sulfosuccinate.

* * * * *